March 2, 1965 H. BLAIR ETAL 3,171,661
"V" PACKING WITH INSERT AND METHOD OF MAKING SAME
Filed Sept. 5, 1961

INVENTORS:
HAROLD BLAIR.
JOSEPH F. OLSEN
BY Charles F. Vojtech
ATT'Y

United States Patent Office 3,171,661
Patented Mar. 2, 1965

3,171,661
V PACKING WITH INSERT AND METHOD OF MAKING SAME
Harold Blair, Dundee, and Joseph F. Olsen, Vandalia, Ill., assignors to Crane Packing Company, Morton Grove, Ill., a corporation of Illinois
Filed Sept. 5, 1961, Ser. No. 135,927
3 Claims. (Cl. 277—205)

This invention relates to machinery packing and to a method of making it.

A presently available and widely used packing for hydraulic pistons is comprised of a ring of rubber coated fabric which is molded to have a generally V-shape in cross section and a curvature approximating the curvature of the piston on which it is to be used. The ring is first formed as a flattened coil of the rubber coated fabric which is then placed in a mold and formed and cured under heat and pressure to have the desired ring shape. For very large diameter pistons, it would be extremely costly to provide molds of the proper size to form a complete ring, not to mention the large presses required to handle the molds. The packing for the very large diameter pistons is therefore usually made in continuous sections in a partial mold, that is, the mold is only large enough to form a segment of the ring and is necessarily open at both ends so that as one segment is formed and cured the segment can be moved out and the adjoining segment can be moved into the mold to be formed and cured.

It has been found that the foregoing type of packing, whether formed in endless rings, or in rings which are split, is dimensionally unstable after it has been formed. This instability manifests itself as a shrinkage of the ring so that if it is initially formed as a split ring, the gap between the ends of the ring increases beyond the point where it can be used as a packing, and it must then be discarded. The shrinkage is particularly noticeable when the ring is installed in a piston operating in water, so that if the ring did fit initially, it soon contracts after contact with water and opens at the split to allow water to pass through.

It has been observed that when packing having an appreciable rubber content is formed with a metal insert, the insert has the effect of reducing shrinkage of the finished packing. Such inserts, however, have been primarily designed as a means for introducing resilience into the packing to spread the ends of the V and thus effect better sealing action between the packing and its cylinder.

It is an object of this invention to provide a packing containing a substantial amount of rubber, wherein an improved form of metallic insert is used to reduce shrinkage of the packing.

The introduction of metal strip into a packing creates new problems in addition to solving an old problem. Thus, if the metal strip is rigid in a circumferential direction relative to a packing ring, the formation of a ring from such packing, either as an endless ring or as a split ring, creates forces in the ring in a circumferential direction which may rupture the metal strip and substantially reduce, if not completely destroy, the dimensional stability of the packing derivable from the strip.

It is a more specific object of this invention to provide a metal insert for a rubber impregnated packing having a form which is such as to mechanically interlock with the softer material of the packing, but which is capable of expansion in a circumferential direction relative to the finished ring to accommodate the normal dimensional changes produced in the packing during the forming and curing operation.

A further specific object of this invention is the provision of a metal insert in a packing for dimensional stability wherein the insert is in the form of a strip of rust-free metal which is corrugated in a direction to allow the strip to increase its dimension in the direction of its length.

These and other objects of this invention will become apparent from the following detailed description of a preferred embodiment thereof when taken together with the accompanying drawings in which.

Figure 6:
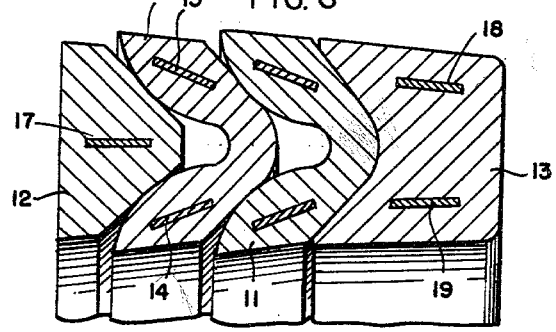
FIG. 6 shows a transverse section through a packing set comprising spaced end rings and two packing rings, all having the insert of FIG. 1 molded therein.

Referring now to the drawings for a detailed description of the invention, and particularly to FIG. 6, a complete packing set may comprise two or more packing rings 10, 11, of generally V-shape in radial cross section, compressed between male and female end rings 12 and 13, respectively.

Each packing ring such as 10 is made by wrapping rubber impregnated heavy fabric such as duck or canvas around one or more metal strips to form a preform, and the preform is then placed in a die and allowed to remain in said die under heat and pressure for a time sufficient to form the packing into a substantially solid rubber mass reinforced by the fabric and metal strip. The number and location of the metal strips and the amount of fabric wrapped around the strips is determined by the shape and mass desired in the finished packing ring.

Figure 2:
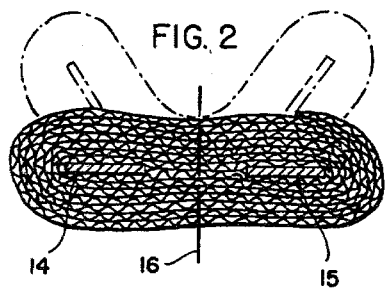
FIG. 2 is an end elevational view of a packing in an intermediate stage of preparation, showing two metal inserts therein.

Assuming that the packing ring is to have the radial cross section of the rings 10, 11, in FIG. 6, the preform for such rings is made in the manner illustrated in FIG. 2. Two metal strips 14, 15 are held in parallel relation to one another, preferably in a fixture designed for this purpose. The fabric is first wound around one strip and then repeatedly around both strips until the required amount of fabric, as determined empirically, is wound on the strips. The preform at this stage is oval in cross-section and may be bent in the plane of the strips, but cannot readily be bent transversely to such plane, and yet, the final product of the preform must be ring-like in form in a plane transverse to the present plane of the strips.

The next step, therefore, is to bend the preform to have an approximate V-shape, with the apex of the V located along a plane disposed between the strips as shown by dot-dash line 16 in FIG. 2. Said plane may be termed the plane of symmetry of the V. This turns the strips 14, 15 to approximately the angular relation to the plane 16 shown in FIG. 3, wherein bending of the packing along an arc of a circle is more readily possible. According to the present invention, however, said strip is given a novel form which particularly facilitates bending of the strip not only along an arc of a circle, but along a frusto-conical surface without rupturing.

Figure 1:
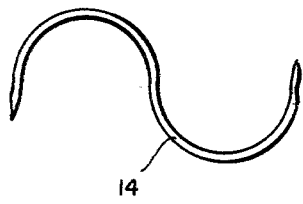
FIG. 1 is a fragmental side elevational view of the insert of this invention.

The form given the strips such as 14 and 15 is shown in FIG. 1. Each strip is preferably initially flat with parallel straight sides. The material of the strips is a metal which is corrosion resistant such as brass, aluminum or stainless steel. The strip is then passed between rolls which have interfitting teeth on them, the strips passing between such teeth to form corrugations in the strips. The form of the corrugations may vary, but it is preferred that such corrugations be sinusoidal in cross section to minimize localization of stress therein. It may be observed that the sinusoidal form will allow the strip to be elongated in response to pressure exerted upon the corrugated surfaces of the strip, and that it will also allow the strip to assume a conical form by flattening the corrugations at the wider base of the cone frustum to a greater degree than at the smaller base. It may be observed further that when a preform having corrugated strips therein is formed in a die under heat and pressure, the rubber impregnated fabric material of the preform will be forced inwardly to fill the corrugations and that therefore a mechanical interlock will be effected between the strip and the material which will resist elongation of the material during forming, and shrinkage of the material after forming.

Figure 3:
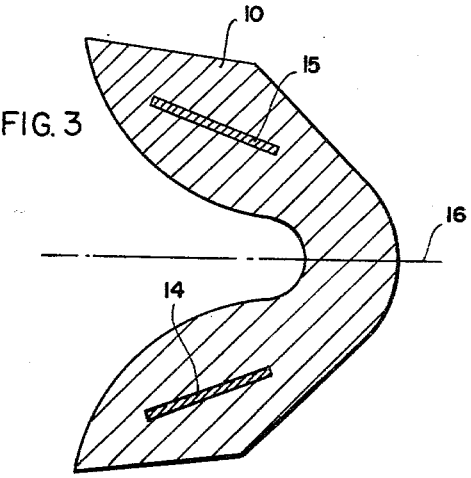
FIG. 3 is a transverse section through a V-type packing with the insert of this invention embedded therein.
Figure 4:
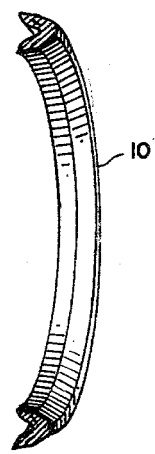
FIG. 4 is a perspective view on a reduced scale of a substantially semi-circular packing made in accordance with this invention.
Figure 5:
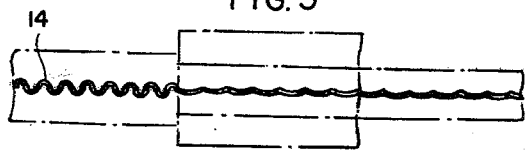
FIG. 5 is a side elevational view on a reduced scale of the insert shown in FIG. 1 showing the change in shape occurring therein after the packing in which it is placed has been formed under heat and pressure.

The final form given the packing may be that illustrated in FIGS. 3 and 4. Where the rings are relatively small in diameter such that the cost of dies to form the entire ring is not excessive, the preform may be first bent to a V-shaped cross section as mentioned above, and the length of the preform is then determined to provide enough of the preform to fill the die cavity. The adjacent ends of the curled preform are cut diagonally to form an overlapped joint which becomes firmly bonded together under the heat and pressure in the die. The finished endless ring may then be split again if desired.

Where the desired ring diameter is too large to make it economically feasible to mold the entire ring at once in a die, the ring may be formed in a partial die, a segment at a time. When formed in this manner, both ends of the die are open and the pressure of the press upon the heated rubber impregnated fabric tends to cause the fabric and rubber to move out of the die at both ends. Where no strips are used, the result is a packing of non-homogeneous composition, since the material can escape from the ends of the die rather than remain in the die to be compacted. Where strips of the above design are used, however, the material is mechanically locked to the strips and hence cannot move outwardly except as permitted by the strips.

It is contemplated that the corrugations will be changed in form as a result of the forming pressure, but it has been found that such change in form is generally accompanied by a permanent set in the metal strips which gives the strips the longitudinal stability to resist deformation of the packing after the packing leaves the die.

A ring of packing incorporating the corrugated strip has been found to retain its circumferential length to a very high and satisfactory degree, even after long periods of exposure to air and water, whether before or after installation. The corrugated form of the strip makes possible the bending of the packing into circular form without unduly stressing the strip, and it provides the necessary interlock for the softer material of the packing to prevent its shrinkage or other change in dimension after formation in a die.

Dimensional stability may be similarly achieved in other forms of packing or in other members of a packing set. Thus corrugated metal inserts may also be incorporated in the male and female end rings 12 and 13. In the case of the male ring, only one such insert 17 may be required. The male ring 12 is generally triangular in radial cross section and the preform may be made by wrapping a number of turns of the rubber impregnated fabric around one strip, after which the somewhat cylindrical preform is bent into circular form with the insert oriented therein in a manner to interpose the least resistance to such bending. The bent preform is then formed in a die under heat and pressure in the same manner as the previously described V packing.

The female ring 13 is formed in substantially the same manner as a packing ring 10, i.e., the preform is wound upon two strips 18, 19 and is then folded to cause the strips to change their planes to those substantially as shown in FIG. 6. The female ring, however, requires more material, which may be provided by a wider spacing of the strips, by getting more turns of fabric upon the strips, or by doing both.

It is understood that other materials and shapes of rings may be adapted to this invention and that the scope of the invention is therefore not to be limited thereto, but is to be determined by the appended claims.

We claim:

1. A packing ring comprising concentric sheet metal rings connected by layers of fabric each layer wound around both said sheet metal rings, and an elastomer dispersed throughout the fabric and bonding the fabric to the metal rings and to itself.

2. A packing ring comprising a ring made of layers of fabric and an elastomer dispersed throughout the fabric and bonding the fabric together, said ring in radial cross section comprising concentric lips connected by a radially disposed membrane, and a metal ring bonded to each lip to give circumferential stability to the ring, said layers of fabric being disposed spirally around both said metal rings.

3. A packing ring comprising a ring of spirally wound fabric and an elastomer dispersed throughout the fabric and bonding the fabric together, said ring in radial cross section comprising concentric radially diverging lips connected at one end by a radially disposed membrane, and a corrugated metal ring bonded to each lip to give circumferential stability to the ring.

References Cited in the file of this patent

UNITED STATES PATENTS

| | | |
|---|---|---|
| 1,511,397 | Christenson | Oct. 14, 1924 |
| 2,069,212 | Buffington | Feb. 2, 1937 |
| 2,124,095 | Wheeler | July 19, 1938 |
| 2,281,195 | Jacobs | Apr. 28, 1942 |
| 2,400,533 | Buffington | May 21, 1946 |
| 2,430,836 | Taylor | Nov. 11, 1947 |
| 2,512,883 | Warren | June 27, 1950 |
| 2,571,225 | Seamark | Oct. 30, 1951 |
| 2,639,198 | Kirkham | May 19, 1953 |
| 2,969,997 | Runton et al. | Jan. 31, 1961 |
| 3,013,830 | Milligan | Dec. 19, 1961 |

FOREIGN PATENTS

| | | |
|---|---|---|
| 14,696 | Great Britain | Aug. 15, 1892 |